Nov. 3, 1953  A. S. ROBINSON  2,657,962

PISTON RING

Filed May 2, 1951

Inventor
A. S. Robinson
By Stevens Downing Ruttle
Attys.

Patented Nov. 3, 1953

UNITED STATES PATENT OFFICE 2,657,962

PISTON RING

Albert Stanley Robinson, Leeds, England, assignor to Specialloid Limited, Leeds, England Application May 2, 1951, Serial No. 224,151

1 Claim. (Cl. 309—45)

This invention relates to scraper rings designed for use on pistons of internal combustion engines.

Normally, it has been the practice, after an internal combustion engine has run for a certain period, to withdraw the pistons and introduce scraper rings, which may be of the slotted and flanged oil control type, into the groove provided in each piston for its accommodation in order to reduce oil consumption.

The object of the invention is to provide a form of scraper ring of the slotted and flanged type which may initially be introduced into the groove provided in the piston for its reception and which is formed to have only a restricted degree of surface contact with the walls of the cylinder, and which after a period of use will become worn to an extent such that the full width and periphery of the flanges on the ring will contact with the cylinder walls thus rendering it unnecessary to withdraw the pistons from their cylinder after the engine has been in use for a period to fit a scraper ring or a new scraper ring.

According to the invention, the flanges are formed to provide initially throughout their peripheries an area of contact with the walls of the cylinder which is substantially less than the surface area of the peripheries of the flanges, in order that after a period of wear, a greater area of contact with the walls of the cylinder will be secured.

In other words, in accordance with the invention, the periphery of the flanges forms a surface which presents a continuous curvature broken only by the split or slit provided in the ring and the curved surface of the flange is formed so that it does not initially contact throughout the whole of its width, that is its dimension in the direction of the axis of the ring with the wall of the cylinder.

Thus, in accordance with the invention the peripheral edge of each of the flanges may be bevelled, the angle of the bevel being such as to ensure that the bevel wears flat after a desired period of use.

In this case the bevel preferably does not extend from one edge or face of the flange to the opposite edge or face and may be formed to leave a cylindrical zone which initially will contact with the wall of the cylinder in which it operates.

Alternatively, the external peripheral edge of each flange may be made concave or convex.

Where the edge is made convex the ring will allow oil to enter between the peripheral edges of the scraper ring and the cylinder wall with which it is associated to an extent sufficient to secure effective lubrication.

Where the faces are inclined, the inclination is inward in a direction from the upper face of the flange towards its lower face, also to secure effective lubrication.

The inclination may be continuous from the lower face of each flange to the upper face thereof.

Preferably, however, as above indicated, the inclination terminates a short distance from the upper face of the flange to provide a portion which is substantially parallel with the axis of the ring or which is curved outward in the direction from the upper face of the flange towards the inclined portion.

The invention will be described further in detail and by way of example with reference to the accompanying drawings in which—

Figure 3:
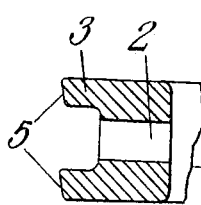

Figure 3 being a fragmentary view in section on a larger scale thereof.

Figure 4:
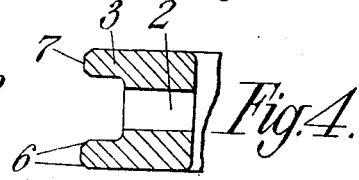

Figure 4 is a view in section of a ring having a somewhat modified construction of the peripheral surfaces of the flanges.

Figure 5:
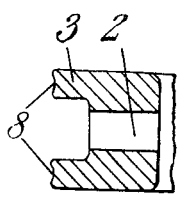

Figure 5 is a corresponding view of a third construction and

Figure 6:
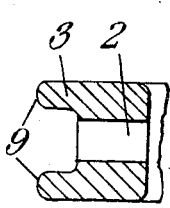

Figure 6 is a similar view of a fourth construction.

Figure 1:
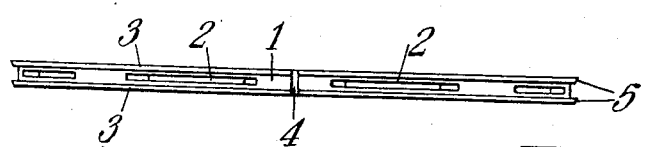
Figure 1 is a view in side elevation.
Figure 2:
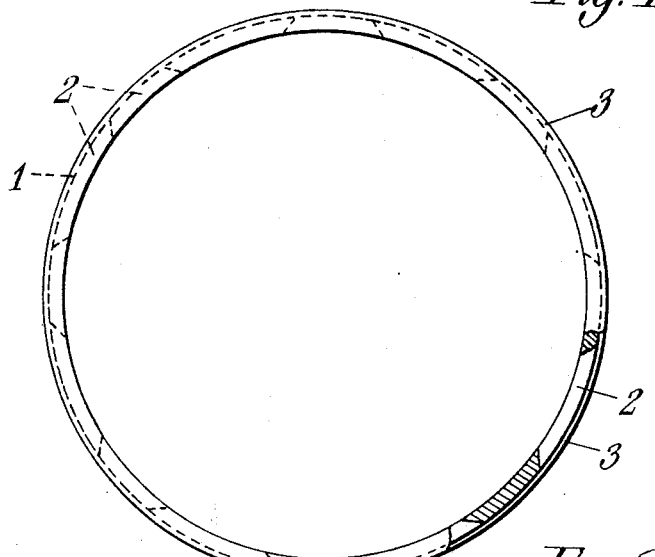
Figure 2 is a view in plan of a scraper ring, in accordance with the invention.

In the drawings 1 is the body of the ring provided with a plurality of slots 2 as shown in Figures 1 and 2 and with flanges 3 extending about the ring which is provided as is normal with a split 4.

In the construction shown in Figures 1, 2 and 3 the peripheral face of each of the flanges is formed by a bevelled surface 5 the bevelling being in one direction only and the bevelled surfaces having a radius at their upper and lower edges.

In the case of the construction illustrated in Figure 4 each of the flanges is provided with two reversely bevelled surfaces 6 which extend into a cylindrical portion 7.

In the case of the construction shown in Figure 5 the peripheral surface of each flange is formed to provide a concave surface 8, while in the construction illustrated in Figure 6 the peripheral surface 9 of the flange is convex.

I claim:

A scraper ring of the slotted and double flanged type adapted to initially be introduced into the groove provided in the piston of an internal combustion engine for its reception, characterised in this that the lower peripheral edge of each flange is chamfered at an angle of about 3 to 6° with the axis of the ring, and in which the chamfer stops short of the upper peripheral edge of each flange and is succeeded by a cylindrical land parallel with the axis of the ring.

ALBERT STANLEY ROBINSON.

References Cited in the file of this patent

UNITED STATES PATENTS

| Number | Name | Date |
|---|---|---|
| 1,356,258 | Burd | Oct. 19, 1920 |
| 1,544,180 | Reiter | June 30, 1925 |
| 1,642,524 | Wenzel | Sept. 13, 1927 |
| 1,913,136 | Wuerfel et al. | June 6, 1933 |
| 2,511,874 | Phillips | June 20, 1950 |

FOREIGN PATENTS

| Number | Country | Date |
|---|---|---|
| 652,143 | Great Britain | Apr. 18, 1951 |